Dec. 29, 1953                I. BOTNICK                 2,664,134
                          ANTISKID CROSS CHAIN
Filed Nov. 26, 1951                                 2 Sheets-Sheet 1
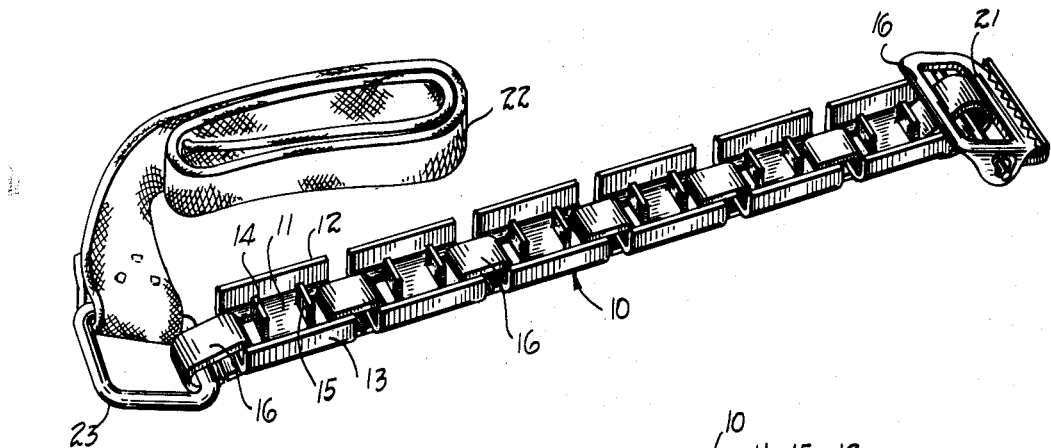
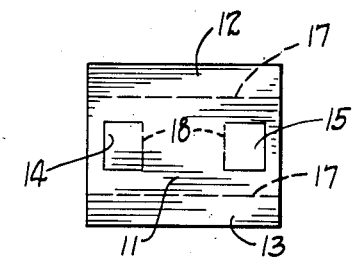
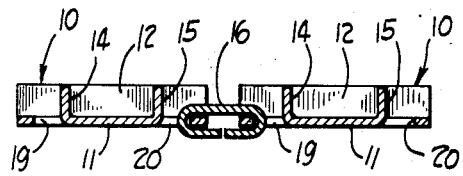
INVENTOR.
IRLIN BOTNICK
BY
*Sanford Schnurmacher*
ATTORNEY Dec. 29, 1953   I. BOTNICK   2,664,134
ANTISKID CROSS CHAIN
Filed Nov. 26, 1951   2 Sheets-Sheet 2

INVENTOR.
IRLIN BOTNICK
BY
Sanford Schnurmacher
ATTORNEY

Patented Dec. 29, 1953

2,664,134

UNITED STATES PATENT OFFICE 2,664,134

ANTISKID CROSS CHAIN

Irlin Botnick, Cleveland, Ohio, assignor to
Snow-Master, Inc., Cleveland, Ohio

Application November 26, 1951, Serial No. 258,143

1 Claim. (Cl. 152—244)

This invention relates to improvements in anti-skid chains for automobiles and more particularly to an improved cross chain forming a part thereof.

The object of this invention is to provide a chain adapted to be used as a grip and non-skidding device on the tires of vehicles, and which is so constructed that it will not injure the tire but will prevent skidding and slipping of the wheels, and which has great wearing surface so as to insure durability.

I attain this result by constructing the links of a chain of such form as to have one side perfectly flat and smooth while the opposite side contains a plurality of upturned flanges and cross-cleats which are adapted to engage the road bed upon which the vehicle travels.

Another object is to provide a cross chain which will act like a mud hook or skate by reason of its peculiar construction and relatively large lateral engaging area.

A further object is to provide a cross chain having unitary tread members which may be inexpensively manufactured from flat sheet material, while at the same time being rugged in structure.

Other objects will be in part obvious from the annexed drawing and in part hereinafter indicated in connection therewith by the following analysis of this invention.

This invention accordingly consists in the features of construction, combination of parts, and in the unique relation of the members and in the relative proportioning and disposition thereof, all as more completely outlined herein.

To enable others skilled in the art to fully comprehend the underlying features thereof that they may embody the same by the numerous modifications in structure and relation contemplated by this invention, a drawing depicting a preferred form of the invention has been annexed as part of this disclosure, and in such drawing, like characters of reference denote corresponding parts throughout all of the views, of which—

Figure 1 is a perspective view showing a preferred form of the invention adapted to be secured to a tire and wheel having spoke openings therethru;

Figure 2 is a top plan view of one of the tread members;

Figure 3 is a top plan view of one of the sheet metal blanks as it appears before the tread member is shaped;

Figure 4 is a sectional view through the middle of two tread members joined together by a link.

Figure 5:
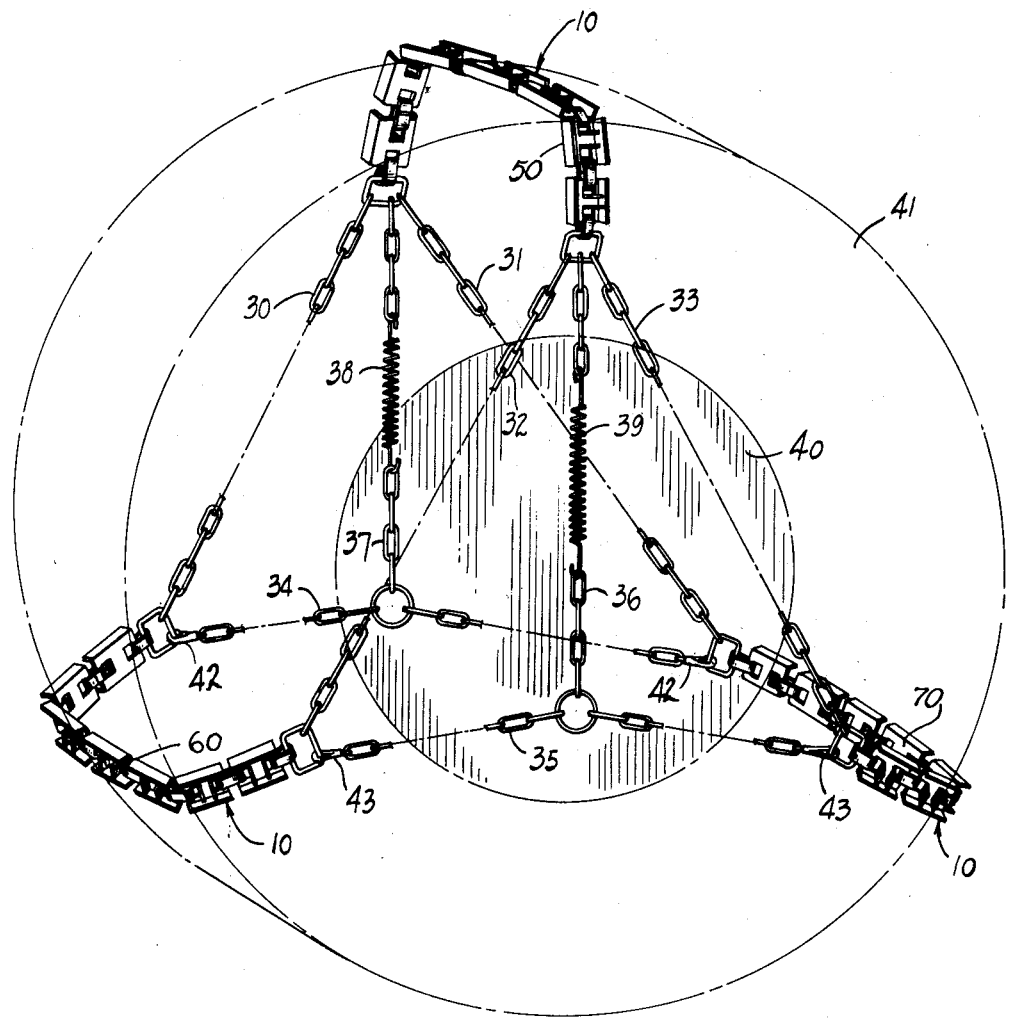
Figure 5 is a perspective view of an alternate method of mounting three of the cross-chains on a tire and solid disk wheel having no openings therethru.

Referring now to the drawing in detail, Figure 1 shows a complete cross-chain as described herein and constituting the invention. The chain is made up of a plurality of tread members 10 connected end to end by means of closed links 16. The length of the chain is determined by the number of tread and link units employed, which is in turn governed by the width of the tire upon which the device is to be used. The trade members 10 are fabricated from flat sheet steel of the proper gage which is first cut into rectangular blanks as shown in the Figure 3. The blanks are incised at two spaced points to define the cleats 14 and 15. The sides of the blank are then bent upward along the score lines 17 to form two parallel side flanges 12 and 13 integral with the bottom plate 11. The cleat elements 14 and 15 are struck from the bottom plate 11 along the score lines 18 inwardly from the respective ends of the bottom plate and upwardly to form the substantially V-shaped tread member 10 shown in the Figures 1, 2 and 4. The space formerly occupied by the cleat elements now defines the boundaries of the terminal holes or slots 19 and 20 at the base of the cleats 14 and 15 respectively. The upturned spaced cleats 14 and 15 are positioned cross-wise of the base-plate between the side flanges 12 and 13 and perpendicular thereto. They are also integral with the base plate 11 and parallel to each other. The formed tread members are positioned end to end and flexibly joined together by means of the flat link members 16 which pass through the terminal slots 19 and 20 of adjacent tread members as is shown most clearly in Figure 4. The links 16 are formed of the same material as the tread members and are flattened in cross section so that they will lay on the tire and not dig into the tire surface. A buckle 21 of conventional type is secured to one of the end links 16 and a web or strap 22 is secured to the opposite end of the chain by means of a ring 23 which engages the link 16, as shown in the Figure 1.

The anti-skid cross chain just described is intended to be used on a tire mounted on a spoked wheel so that the web 22 can be passed through the wheel from the inner side to the outer side and placed in locked engagement with the buckle 21, while the chain lays across the tire. The flat underface of the bottom plate 11 contacts the tire and will not dig into the tire as in the case with the conventional type of twisted link cross chains.

In operation this cross chain serves the double purpose of preventing side skidding, and also of affording traction, either in backing or going forward. The side skidding is prevented by the engagement of the cleat elements 14 and 15 with the road or pavement, and the traction is afforded by the engagement of the side flanges 12 and 13 with the road or pavement as the wheel rotates. As these cleats and flanges are about ⅜ of an inch in depth and of comparatively slight thickness and hardness to resist wear, they present relatively sharp road engaging elements which remain effective during the whole life of the chain. The tread member just described is economical to manufacture since the flanges and cleats are integral parts of the plate 11 and require no assembling or other time consuming fabricating operations.

It is the usual custom to mount three of such cross-chains in spaced relation around a wheel. However, in the case of solid disk wheels the buckle and web attaching means cannot be used. In the Figure 5, reference numerals 40 and 41 indicate a solid disk wheel and a tire mounted thereon, respectively. Three cross-chains 50, 60 and 70 are shown mounted on the wheel by means of inner side chains 30, 31 and 34 which connect the inner ends of the cross chains and outer side chains 32, 33 and 35 which connect the outer ends of the cross chains. Side chains 30, 31, 32 and 33 are permanently connected to their respective cross chain ends. Side chains 34 and 35 have locking hooks 42 and 43 respectively which can be detachably secured to the ends of the cross chain 70. In applying the anti-skid elements, the side chain hooks 42 and 43 are disconnected from the cross-chain 70 and the three cross chains are laid on the tire loosely. The hooks 42 and 43 are then re-connected to the ends of the cross-chain 70. The three cross chains are now loosely connected by means of an inner and outer triangle of side chains, as shown. Tension equalizers 37 and 36 having spring elements 38 and 39 respectively mounted therein, extend from the apex of the triangles to the mid point of the base chains 34 and 35. These equalizers pull the side chains into a taught configuration which holds the cross-chains securely in place. This method of mounting can be employed without lifting the wheel off the ground or rolling the wheel onto the outspread chain, as is necessary with conventional mounting means.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claim.

I claim:

A non-skid cross chain of the character set forth, comprising in combination, a plurality of similar tread members, each of said members being formed from a blank of rectangular configuration, the blank being shaped to provide a flat bottom portion having a pair of parallel side flanges and two longitudinally spaced square slots therebetween, the said slots being proximate the open ends of the said bottom portion; a pair of transverse cleats positioned parallel to one another at the inner edges of said slots within the confines of said side flanges; and flattened link members of rectangular cross-section passing through the slots of adjacent tread members and disposed within the confines of said side flanges.

IRLIN BOTNICK.

References Cited in the file of this patent

UNITED STATES PATENTS

| Number | Name | Date |
|---|---|---|
| 995,372 | Saliger | June 13, 1911 |
| 1,142,909 | Purdie | June 15, 1915 |
| 1,536,886 | Freeman | May 5, 1925 |
| 1,809,354 | Peters | June 9, 1931 |

FOREIGN PATENTS

| Number | Country | Date |
|---|---|---|
| 45,188 | Norway | May 21, 1928 |